United States Patent
Lim et al.

(10) Patent No.: US 8,798,793 B2
(45) Date of Patent: Aug. 5, 2014

(54) APPARATUS AND METHOD FOR STABILIZING HUMANOID ROBOT

(75) Inventors: Bok Man Lim, Seoul (KR); Kyung Shik Roh, Seongnam-si (KR); San Lim, Suwon-si (KR); Myung Hee Kim, Suwon-si (KR); Guo Chun Xu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 12/850,085

(22) Filed: Aug. 4, 2010

(65) Prior Publication Data
US 2011/0040407 A1 Feb. 17, 2011

(30) Foreign Application Priority Data

Aug. 12, 2009 (KR) .................. 10-2009-0074045

(51) Int. Cl.
*G05B 19/18* (2006.01)
(52) U.S. Cl.
USPC .......................................................... 700/253
(58) Field of Classification Search
USPC .................. 700/245, 250, 253, 258, 260
See application file for complete search history.

(56) References Cited

PUBLICATIONS

Kajita, S.; Kanehiro, F.; Kaneko, K.; Fujiwara, K.; Harada, K.; Yokoi, K.; Hirukawa, H.; , "Resolved momentum control: humanoid motion planning based on the linear and angular momentum," Intelligent Robots and Systems, 2003. (IROS 2003). Proceedings. 2003 IEEE/RSJ International Conference on , vol. 2, no., pp. 1644-1650 vol. 2, Oct. 27-31, 2003.*
Harada, K.; Kajita, S.; Saito, H.; Morisawa, M.; Kanehiro, F.; Fujiwara, K.; Kaneko, K.; Hirukawa, H.; , "A Humanoid Robot Carrying a Heavy Object," Robotics and Automation, 2005. ICRA 2005. Proceedings of the 2005 IEEE International Conference on , vol., no., pp. 1712-1717, Apr. 18-22, 2005.*

* cited by examiner

*Primary Examiner* — Khoi Tran
*Assistant Examiner* — Adam Mott
(74) *Attorney, Agent, or Firm* — Staas & Halsey LLP

(57) ABSTRACT

Disclosed is a humanoid robot apparatus, method and computer-readable medium thereof related to lifting and holding a heavy object having a weight unknown to the robot, by measuring an external force acting on the robot. Linear momentum and rotational momentum are compensated for stepwise according to the degree of stability of the robot which is determined based on the measured external force. Accordingly, the robot stably lifts and holds the object without losing its balance.

9 Claims, 12 Drawing Sheets

APPARATUS AND METHOD FOR STABILIZING HUMANOID ROBOT

CROSS-REFERENCE TO RELATED APPLICATIONS

This application claims the benefit of Korean Patent Application No. 2009-74045, filed on Aug. 12, 2009 in the Korean Intellectual Property Office, the disclosure of which is incorporated herein by reference.

BACKGROUND

1. Field

Example embodiments relate to an apparatus, method and computer-readable medium stabilizing a humanoid robot, which may allow the robot to maintain a stable posture while keeping its balance when lifting and holding a heavy object having a weight unknown to the robot.

2. Description of the Related Art

An intelligent robot receives external information using a sense of sight or a sense of hearing, like a human, makes a judgment, and takes an appropriate action. A humanoid robot is a type of intelligent robot. The humanoid robot has the same appearance as a human, is bipedal, has two arms, and manipulates objects by hand.

The humanoid robot has joints similar to those of a human. Research into a humanoid robot for providing various services in place of a person in a human working and living space has been actively conducted.

In order to variously implement the whole-body operation of a humanoid robot like a human, actuators mounted in many joints of the robot need to be simultaneously and efficiently controlled. By such control, the natural whole-body motion of the robot may emulate a human action.

When the humanoid robot is brought into contact with an object, difficulty is increased due to a variation in kinetics of the robot caused by an external environment. If the weight of an object is known in advance, the kinetics of the robot changed when lifting and holding the object may be relatively accurately calculated and thus the whole-body motion of the robot may be generated. Accordingly, the robot may easily maintain a stable posture.

If an object having an unknown weight is lifted and held by the robot, it is difficult to estimate a variation in kinetics of the robot. Therefore, the robot may lose its balance and become unstable. For example, when the robot bends its legs in order to hold up a table having an object on the table (FIG. 1A) by lifting and holding the table with two arms (FIG. 1B), the robot may keep its balance. However, when the robot lifts and holds a table with two arms while straightening its legs (FIG. 1C), the robot may lose its balance and fall forward if the object is heavy.

When a heavy object is lifted and held, the whole-body motion of the robot needs to be controlled while taking into consideration the difficulty in estimating a variation in kinetics of the robot, in order to allow the robot to maintain a stable posture while keeping its balance.

SUMMARY

Therefore, it is an aspect of the example embodiments to allow a humanoid robot to keep its balance by compensating for linear momentum and rotational momentum stepwise using external force when lifting and holding a heavy object using the whole body thereof.

Additional aspects will be set forth in part in the description which follows and, in part, will be apparent from the description, or may be learned by practice of the disclosure.

The foregoing and/or other aspects are achieved by providing an apparatus stabilizing a humanoid robot, the apparatus including: a sensor to measure external force acting on the robot while the robot lifts and holds an object; and a robot controller to compensate for linear momentum and rotational momentum using the measured external force and to control an operation to lift and hold the object having a weight unknown to the robot by the whole-body motion of the robot generated using the compensated momentums.

The sensor may include an ankle Force and Torque (F/T) sensor and a wrist F/T sensor.

The robot controller may include a linear momentum compensation unit, a rotational momentum compensation unit, and a robot stabilization unit. The linear momentum compensation unit may compensate for the linear momentum using the measured value of the F/T sensor attached to the wrist of the robot, and the rotational momentum compensation unit may compensate for the rotational momentum using the measured value of the F/T sensor attached to the ankle of the robot.

The robot stabilization unit may plan or estimate reference linear momentum and reference rotational momentum without considering the external force according to Equation 1:

$$P_{ref,x}=Mk_1(x_{ref}-x_{CoG})+Mx'_{ref}$$

$$P_{ref,y}=Mk_2(y_{ref}-y_{CoG})+My'_{ref}$$

$$P_{ref,z}=Mk_3(z_{ref}-z_{CoG})+Mz'_{ref}$$

$$L_{ref,x}=L_{ref,y}=L_{ref,z}=0 \quad \text{Equation 1}$$

where, M denotes the weight of the robot, k1, k2 and k3 denote gains, xref, yref and zref respectively denote planned robot center-of-gravity position trajectories in axial directions (x-axis, y-axis and z-axis directions), x'ref, y'ref and z'ref respectively denote planned robot center-of-gravity velocity trajectories in the axial directions (x-axis, y-axis and z-axis directions), and xCoG, yCoG and zCoG respectively denote current robot center-of-gravity positions in the axial directions (x-axis, y-axis and z-axis directions).

The robot controller may further include a Zero Momentum Point (ZMP) calculation unit, which, for example, only compensates for the linear momentum. As another example, the ZMP calculation unit may compensate for both the linear momentum and the rotational momentum stepwise. The ZMP calculation unit stabilizes the robot, which is determined based on a calculated ZMP.

If the calculated ZMP is outside a stable zone and is within a linear momentum correction zone, the linear momentum compensation unit may provide linear momentum P'ref,x and P'ref,y compensated for according to Equation 3 related to the robot stabilization unit:

$$P'_{ref,x}=Mk_1(x_{ref}-x'_{CoG})+Mx'_{ref}$$

$$P'_{ref,y}=Mk_2(y_{ref}-y'_{CoG})+My'_{ref}$$

$$P'_{ref,z}=P_{ref,z}$$

$$x'_{CoG}=((-P_{x,RH}+ZMP_x)\times f_{z,RH}+(-P_{x,LH}+ZMP_x)\times f_{z,LH}))/Mg$$

$$y'_{CoG}=((-P_{y,RH}+ZMP_y)\times f_{z,RH}+(-P_{y,LH}+ZMP_y)\times f_{z,LH}))/Mg \quad \text{Equation 3}$$

where, RH denotes a right hand, LH denotes a left hand, Px,RH denotes the position of the right hand, Py,LH denotes the position of the left hand, fz,RH denotes force acting on the right hand, fz,LH denotes force acting on the left hand, g denotes acceleration due to gravity, ZMPx denotes a ZMP in an x-axis direction, and ZMPy denotes a ZMP in a y-axis direction.

If the calculated ZMP is excessively outside a stable zone and is within a rotational momentum correction zone, the rotational momentum compensation unit may provide rotational momentums L'ref,x and L'ref,y compensated for according to Equation 4 related to the robot stabilization unit:

$$L'_{ref,x} = k_4 m_x$$

$$L'_{ref,y} = k_5 m_y \quad \text{Equation}$$

where, k4 and k5 denote gains, and mx and my respectively denote the moments of the x-axis direction and the y-axis direction measured by the F/T sensor attached to an ankle.

The foregoing and/or other aspects are achieved by providing an apparatus stabilizing a humanoid robot, the apparatus including: an ankle Force and Torque (F/T) sensor to measure external force acting on ankles of the robot when lifting and holding an object; a wrist F/T sensor to measure external force acting on wrists of the robot when lifting and holding the object; and a robot controller to change whole-body motion which is initially generated before lifting and holding the object according to the measured external forces and to control an operation to lift and hold the object by the changed whole-body motion.

The foregoing and/or other aspects are achieved by providing a method of stabilizing a humanoid robot, the method including: measuring, by a processor, external force acting on the robot lifting and holding an object; calculating, by the processor, a Zero Momentum Point (ZMP); and compensating for linear momentum and rotational momentum if the calculated ZMP is outside a stable zone and lifting and holding the object by whole-body motion generated using the compensated momentums.

At least one of the momentums may be compensated for stepwise according to the degree to which the calculated ZMP is outside the stable zone.

The linear momentum may be compensated for if the calculated ZMP is outside the stable zone and is in a linear momentum correction zone.

The linear momentum and the rotational momentum may be compensated for stepwise if the calculated ZMP is in a rotational momentum correction zone located outside a linear momentum correction zone.

The foregoing and/or other aspects are achieved by providing a method of stabilizing a humanoid robot, the method including: estimating, by a processor, reference linear momentum and reference rotational momentum without considering external force before lifting and holding an object; calculating a Zero Momentum Point (ZMP) using a value measured by a Force and Torque (F/T) sensor attached to one or more ankles; compensating, by the processor, for the estimated reference linear momentum using a value measured by an F/T sensor attached to one or more wrists if the calculated ZMP is in a first zone located outside a stable zone; compensating, by the processor, for the estimated reference rotational momentum using a value measured by the F/T sensor attached to the ankles if the calculated ZMP is in a second zone located outside the first zone; and changing whole-body motion using one of the compensated linear momentum and the compensated rotational momentum and controlling an operation to lift and hold the object.

A heavy object having a weight unknown to a robot may be stably lifted and held by compensating for linear momentums and rotational momentums stepwise according to a degree of stability of the robot. In addition, the whole-body motion of the robot may be appropriately changed when the position and weight of the object are changed while holding the object.

The foregoing and/or other aspects are achieved by providing at least one computer readable medium including computer readable instructions that control at least one processor to implement methods of one or more embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1A:
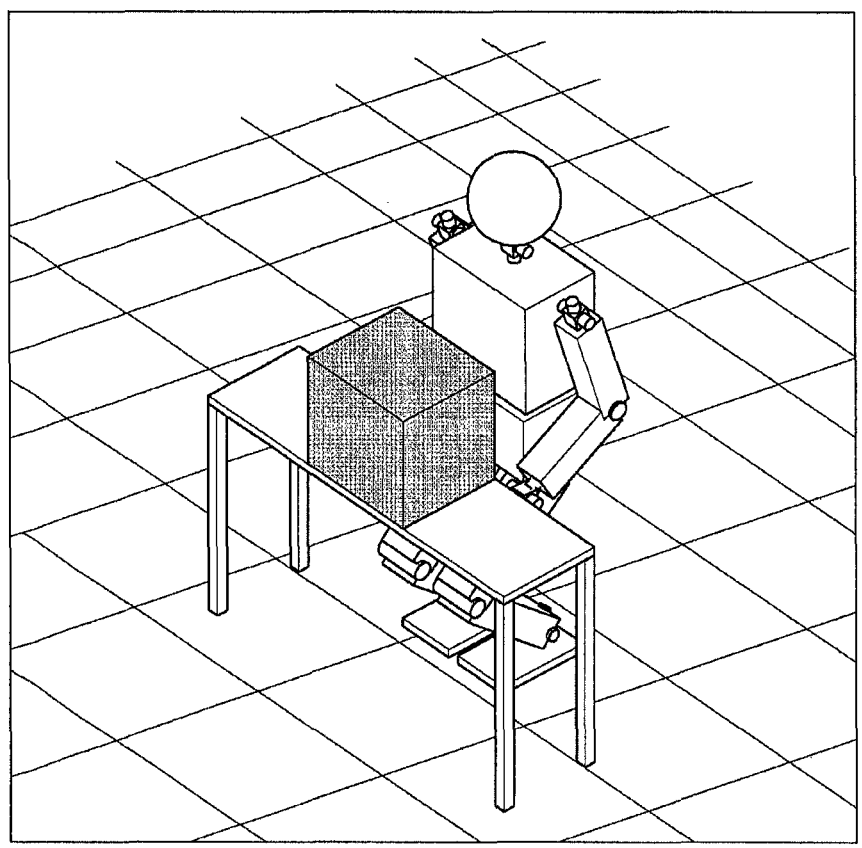
FIG. 1 is a view illustrating a change in the whole-body motion of a humanoid robot when the humanoid robot lifts and holds a heavy object without considering external force.
Figure 1B:
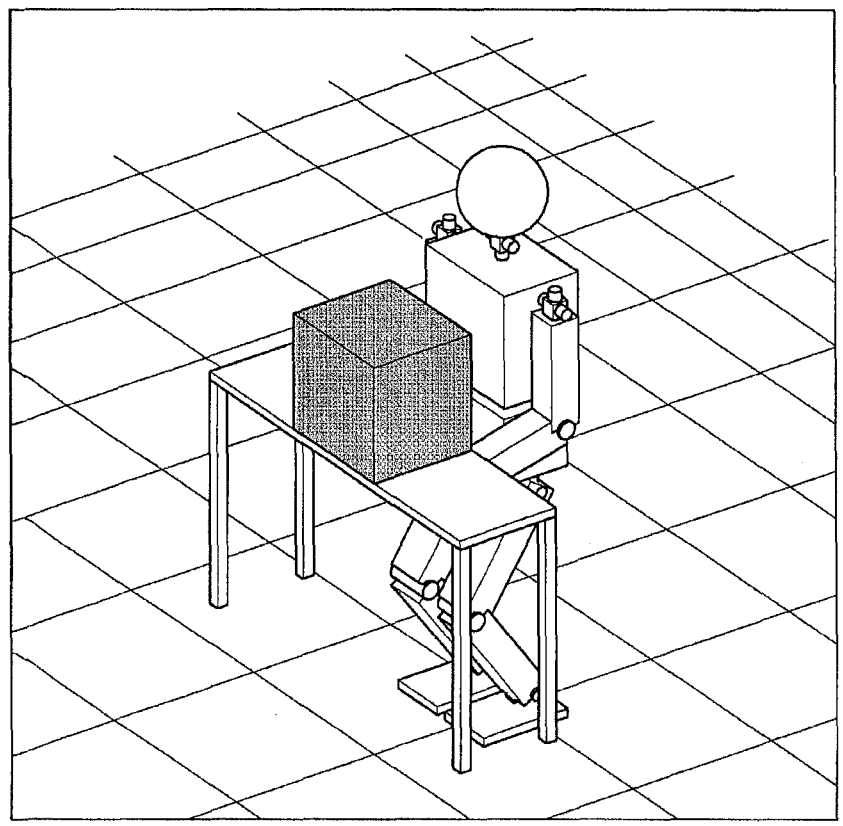
Figure 1C:
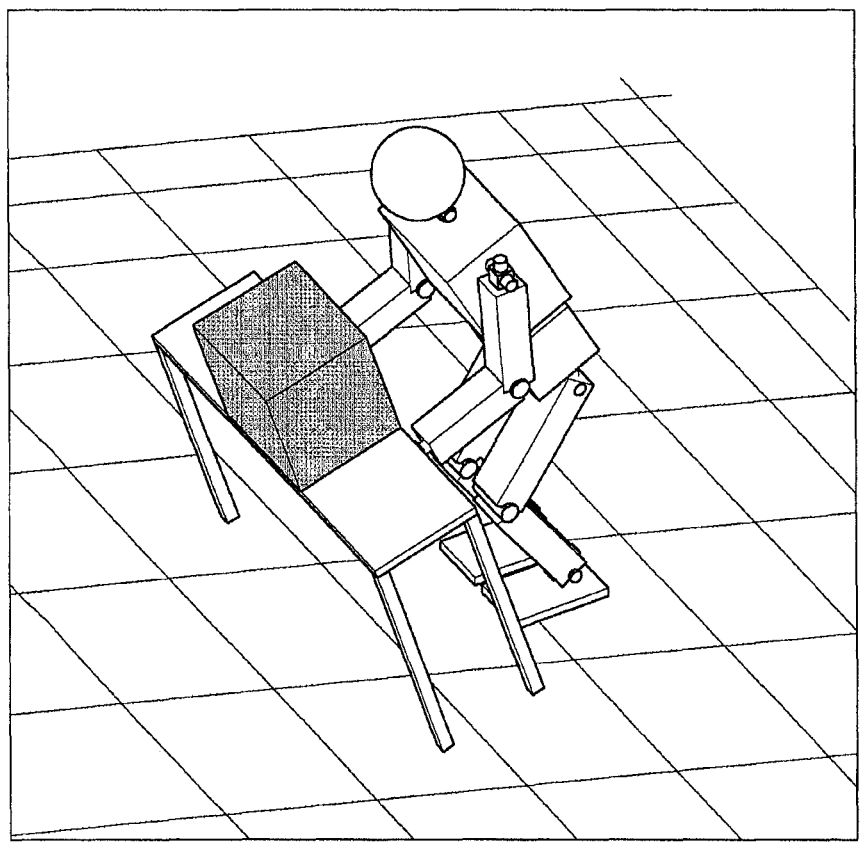

Reference will now be made in detail to embodiments, examples of which are illustrated in the accompanying drawings, wherein like reference numerals refer to like elements throughout.

When a humanoid robot lifts and holds an object using its whole body thereof, and, more particularly, when a humanoid robot lifts and holds a heavy object having a weight unknown to the robot, it is difficult to estimate a variation in kinetics of the robot. The term "heavy object" refers to a physical object having a weight which may sufficiently change the kinetics of the robot. It is assumed that the robot does not know the weight of the object in advance and weight data is not externally obtained.

Figure 2:
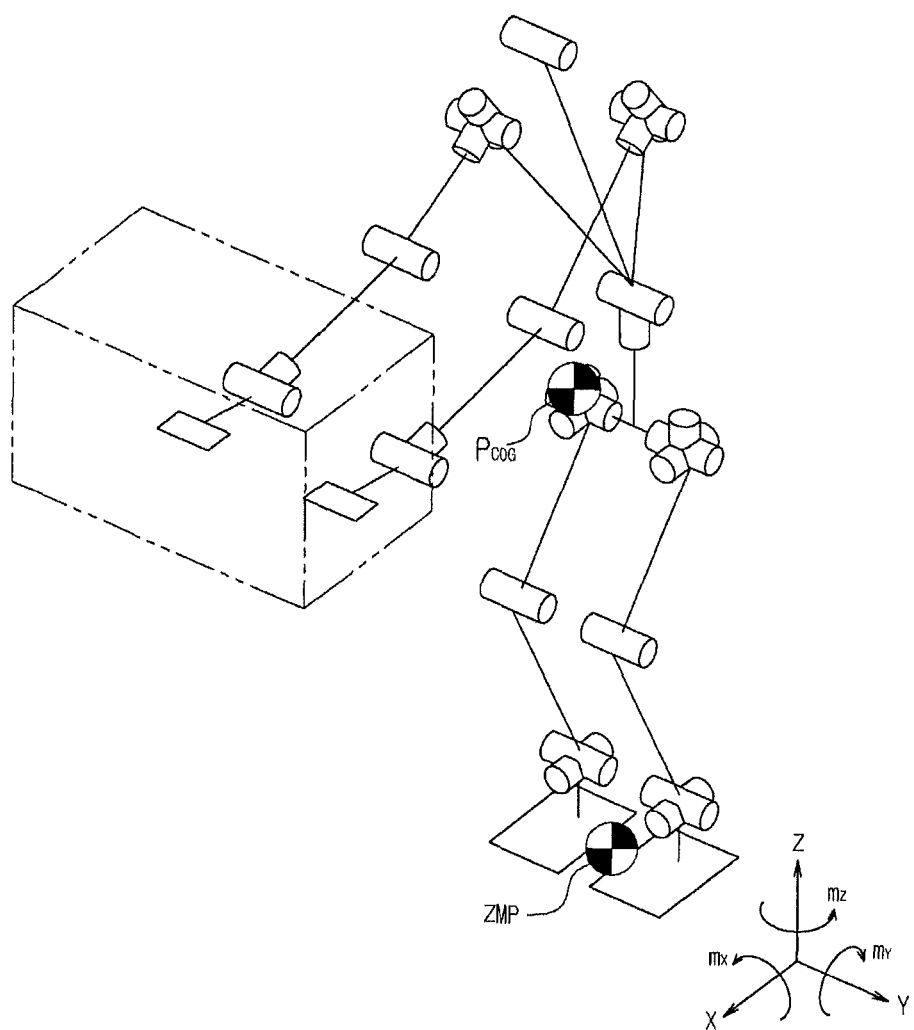
FIG. 2 is a view of a model of a humanoid robot lifting and holding an object.

As shown in FIG. 2, a humanoid robot which lifts and holds an object takes a stable posture. It can be seen that the robot's center of gravity PCoG=(xCoG, yCoG, zCoG) is located in the vicinity of the waist and a Zero Momentum Point (ZMP) is located between two feet.

In the present embodiment, external force is measured and analyzed using Force and Torque (F/T) sensors attached to the ankles and wrists of the robot, and linear momentum and rotational momentum of the robot are compensated for stepwise based on the external force.

Figure 3:
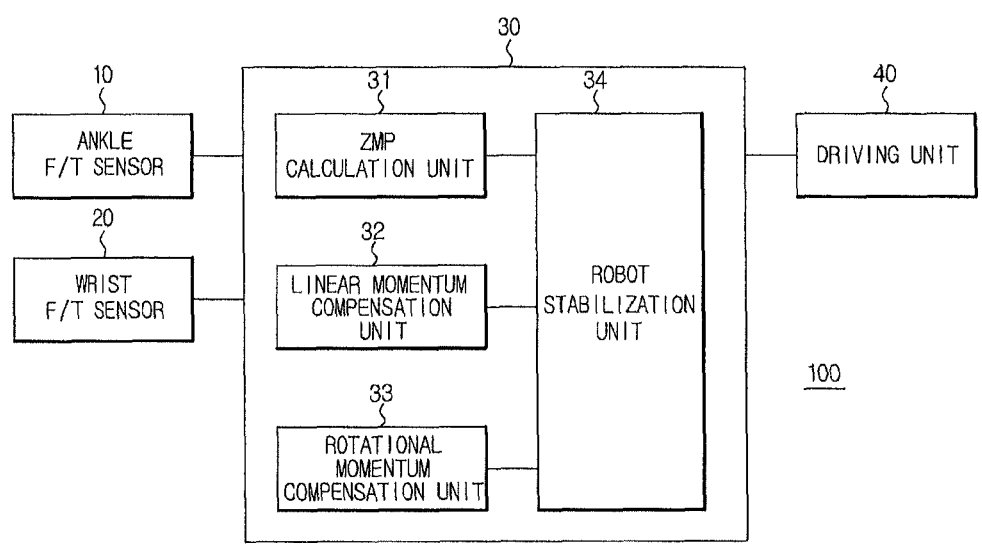
FIG. 3 is block diagram of an apparatus stabilizing a humanoid robot according to example embodiments.

As shown in FIG. 3, an apparatus stabilizing a humanoid robot 100 includes ankle F/T sensors 10, wrist F/T sensors 20, a robot controller 30, and a driving unit 40 to drive actuators mounted in the joints of the robot.

The ankle F/T sensors 10 are attached to the ankles of the robot to measure 6-axis forces and moments fx, fy, fz, mx, my, and mz which act on the ankles of the robot.

The wrist F/T sensors 10 are attached to the wrists of the robot to measure 6-axis forces and moments which act on the wrists of the robot.

The robot controller 30 includes a ZMP calculation unit 31, a linear momentum compensation unit 32, a rotational momentum compensation unit 33, and a robot stabilization unit 34. The robot stabilization unit 34 generates the whole-body motion of the robot using input values received through the ZMP calculation unit 31, the linear momentum compensation unit 32 and the rotational momentum compensation unit 33, calculates control input values to control the angles of the joints of the robot according to the generated whole-body motion, and provides the control input values to the driving unit 40.

The ZMP calculation unit 31 calculates the ZMP to determine whether the feet of the robot supported on the ground are stable by satisfying a ZMP restriction condition, and provides the calculated ZMP to the robot stabilization unit 34.

Figure 4:
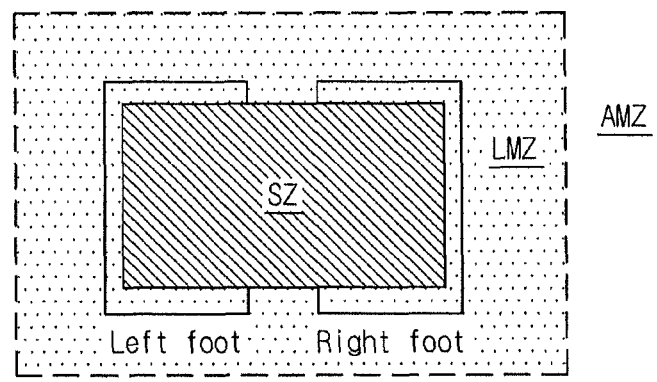
FIG. 4 is a view illustrating zones representing compensation references of linear and rotational momentums according to example embodiments.

The linear momentum compensation unit 32 compensates for linear momentums, which are first planned or are set in a previous control period, using the values measured using the F/T sensors attached to the wrists of the robot, and provides the compensated linear momentums to the robot stabilization unit 34. As shown in FIG. 4, the linear momentums are compensated for if the calculated ZMP is outside a stable zone SZ and is present in a linear momentum correction zone LMZ.

The rotational momentum compensation unit 33 compensates for rotational momentums, which are planned (estimated) or are set in a previous control period, using the values measured using the F/T sensors attached to the ankles of the robot, and provides the compensated rotational momentums to the robot stabilization unit 34. As shown in FIG. 4, the rotational momentums are compensated for if the calculated ZMP is outside the stable zone SZ and is present in a rotational momentum correction zone AMZ.

Before lifting and holding an object, the robot stabilization unit 34 plans or estimates reference linear momentums Pref,x, Pref,y and Pref,z and reference rotational momentums Lref,x, Lref,y and Lref,z according to Equation 1 without considering external force (it is assumed that external force is negligible). At this time, it is assumed that the upper part of the body of the robot which lifts and holds an object is stationary. Thus, the reference rotational momentums are set to 0.

$$P_{ref,x}=Mk_1(x_{ref}-x_{CoG})+Mx'_{ref}$$

$$P_{ref,y}=Mk_2(y_{ref}-y_{CoG})+My'_{ref}$$

$$P_{ref,z}=Mk_3(z_{ref}-z_{CoG})+Mz'_{ref}$$

$$L_{ref,x}=L_{ref,y}=L_{ref,z}=0 \quad \text{Equation 1}$$

where, M denotes the weight of the robot, k1, k2 and k3 denote gains, xref, yref and zref respectively denote planned robot center-of-gravity position trajectories in axial directions (x-axis, y-axis and z-axis directions), x'ref, y'ref and z'ref respectively denote planned robot center-of-gravity velocity trajectories in the axial directions (x-axis, y-axis and z-axis directions), and xCoG, yCoG and zCoG respectively denote current robot center-of-gravity positions in the axial directions (x-axis, y-axis and z-axis directions).

The robot stabilization unit 34 determines an initial posture when the object is first lifted and a final posture when the object reaches a target position, interpolates these postures, and generates the whole-body motion to lift and hold the object. Then, the object is held using the two arms. At this time, the forces and moments acting on the ankles are measured using the ankle F/T sensors 10 and the ZMP is calculated by the ZMP calculation unit 31 using the measured values according to Equation 2.

$$ZMP=(ZMP_x,ZMP_y)$$

$$ZMP_x=-m_y/f_z$$

$$ZMP_y=m_x/f_z \quad \text{Equation 2}$$

where, ZMPx denotes the ZMP of the x-axis direction and ZMPy denotes the ZMP of the y-axis direction.

If the calculated ZMP is within the stable zone SZ, it is determined that the robot, which lifts and holds the object, keeps its balance, and the holding operation is continuously performed.

If the calculated ZMP is outside the stable zone SZ and is present in the linear momentum correction zone LMZ, it is determined that the robot, which lifts and holds the object, loses its balance. Accordingly, if the lifting and holding operation is continuously performed in this state, the robot may become increasingly unbalanced and the robot may fall. At this time, the linear momentum compensation unit 32 compensates for linear momentums according to Equation 3 using the values measured using the F/T sensors attached to the wrists in order to measure external force, and provides the compensated linear momentums P'ref,x and P'ref,y to the robot stabilization unit 34. At this time, the compensation of the linear momentum is performed with respect only to the x-axis direction and the y-axis direction.

$$P'_{ref,x}=Mk_1(x_{ref}-x'_{CoG})+Mx'_{ref}$$

$$P'_{ref,y}=Mk_2(y_{ref}-y'_{CoG})+My'_{ref}$$

$$P'_{ref,z}=P_{ref,z}$$

$$x'_{CoG}=((-P_{x,RH}+ZMP_x) \times f_{z,RH}+(-P_{x,LH}+ZMP_x) \times f_{z,LH}))/Mg$$

$$y'_{CoG}=((-P_{y,RH}+ZMP_y) \times f_{z,RH}+(-P_{y,LH}+ZMP_y) \times f_{z,LH}))/Mg \quad \text{Equation 3}$$

where, RH denotes a right hand, LH denotes a left hand, Px,RH denotes the position of the right hand, Py,LH denotes the position of the left hand, fz,RH denotes force acting on the right hand, fz,LH denotes force acting on the left hand, and g denotes acceleration due to gravity.

Figure 5:
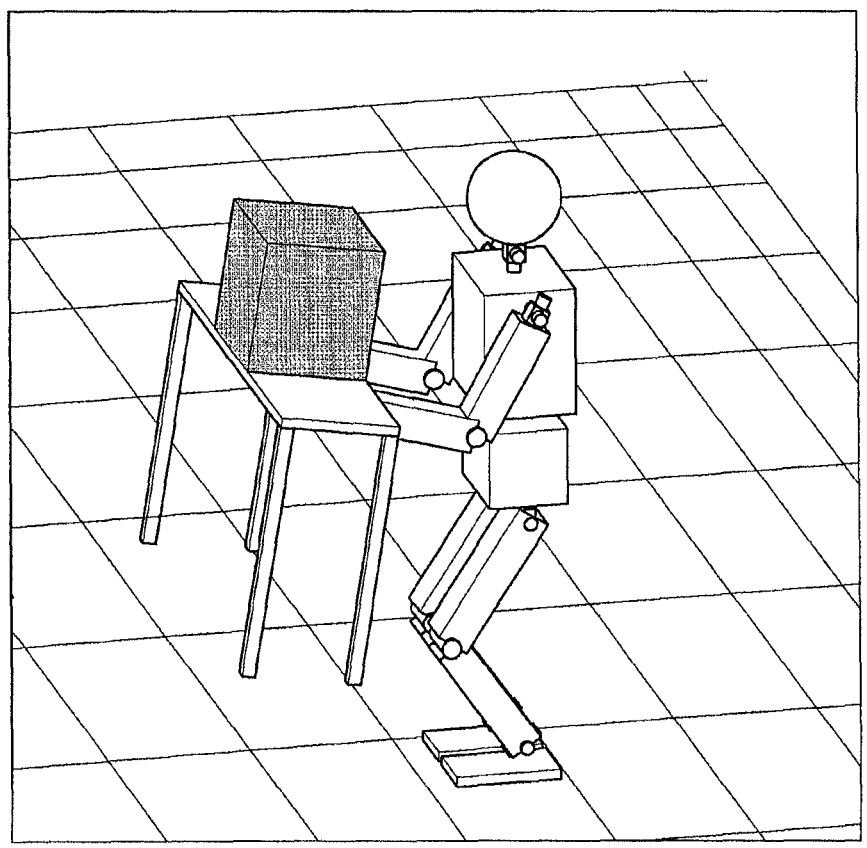
FIG. 5 is a view illustrating an operation to allow a humanoid robot to keep its balance by compensating for linear momentum according to example embodiments.

The robot stabilization unit 34 generates the whole-body motion of the robot using the compensated linear momentums, calculates the control input values to control the angles of the joints of the robot according to the generated whole-body motion, and provides the control input values to the driving unit 40, such that the robot recovers its balance and continuously holds the object. As shown in FIG. 5, if only the linear momentums are compensated for to control the whole-body motion when the robot loses its balance, the robot may lift and hold the object while keeping a stable posture.

If the robot does not recover its balance even after compensating for the linear momentums, that is, if the calculated ZMP is excessively outside of the stable zone SZ and is within the rotational momentum correction zone (AMZ), the rotational momentum compensation unit 33 compensates for rotational momentums according to Equation 4 using the values measured by the F/T sensors attached to the ankles, and provides the compensated rotational momentums L'ref,x and L'ref,y to the robot stabilization unit 34.

$$L'_{refx} = k_4 m_x$$

$$L'_{refy} = k_5 m_y \quad \text{Equation 4}$$

where, k4 and k5 denote gains, and mx and my respectively denote the moments of the x-axis direction and the y-axis direction measured by the F/T sensors attached to the ankles. At this time, the moments measured by the ankle F/T sensors include forces acting on hands which lift and hold the object.

Figure 6:
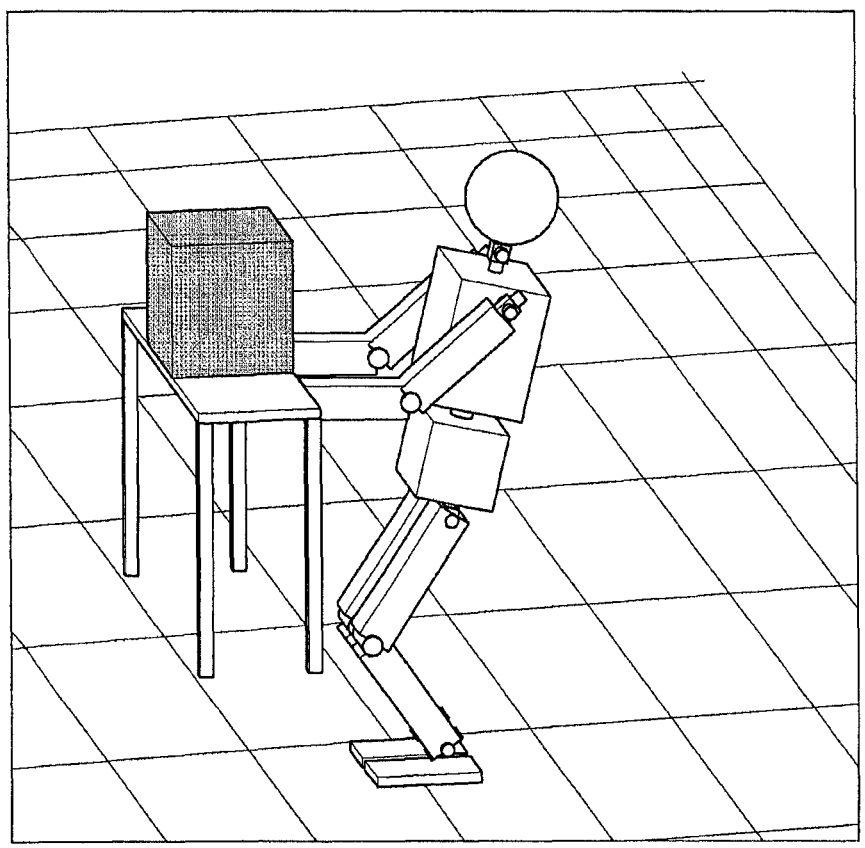
FIG. 6 is a view illustrating an operation to allow a humanoid robot to keep its balance by compensating for linear and rotational momentums according to example embodiments.

The robot stabilization unit 34 generates the whole-body motion of the robot using the compensated linear momentums and the compensated rotational momentums. As shown in FIG. 6, the whole-body motion is changed by pushing the upper part of the body of the robot backward or pushing the hip of the robot backward. The control input values to control the angles of the joints of the robot are calculated according to the changed whole-body motion and are provided to the driving unit 40 so that the robot recovers its balance and continuously holds the object.

Meanwhile, the weight and position of the object may be changed while the heavy object is held. Even in this case, the robot stabilization unit 34 may compensate for only the linear momentums or compensate for both the linear momentums and the rotational momentums according to the stability of the robot. In other words, according to the degree to which the calculated ZMP is outside the stable zone SZ, the robot compensates to keep its balance and stably holds the object.

Figure 7:
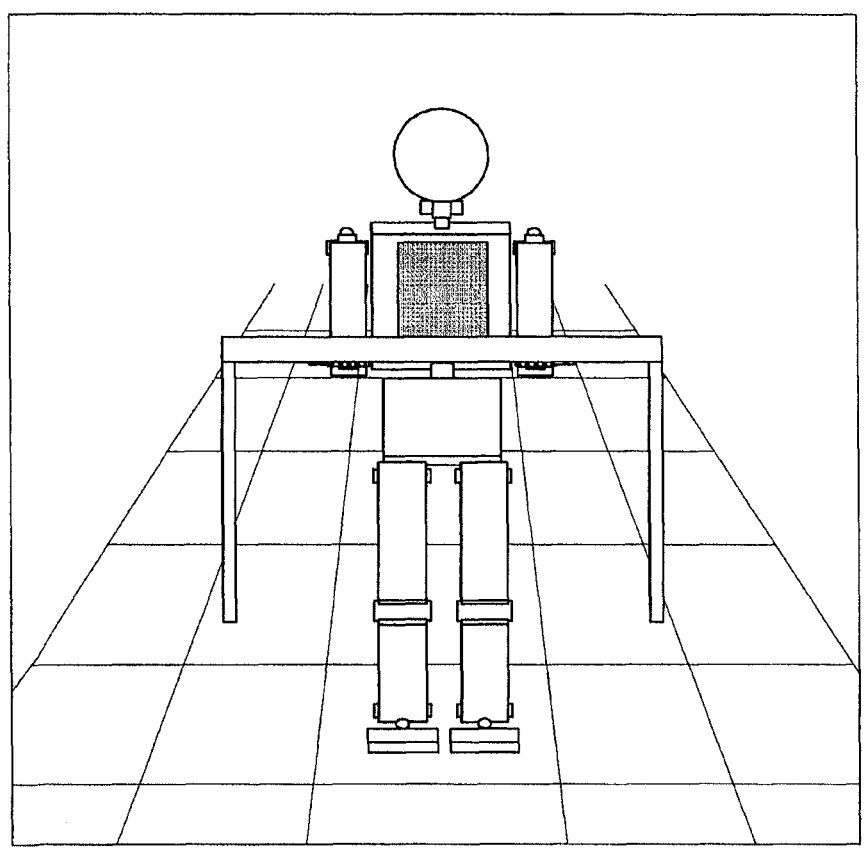
FIGS. 7 to 9 are views illustrating an operation to allow a humanoid robot to keep its balance when the weight and position of an object are changed, according to example embodiments.
Figure 8:
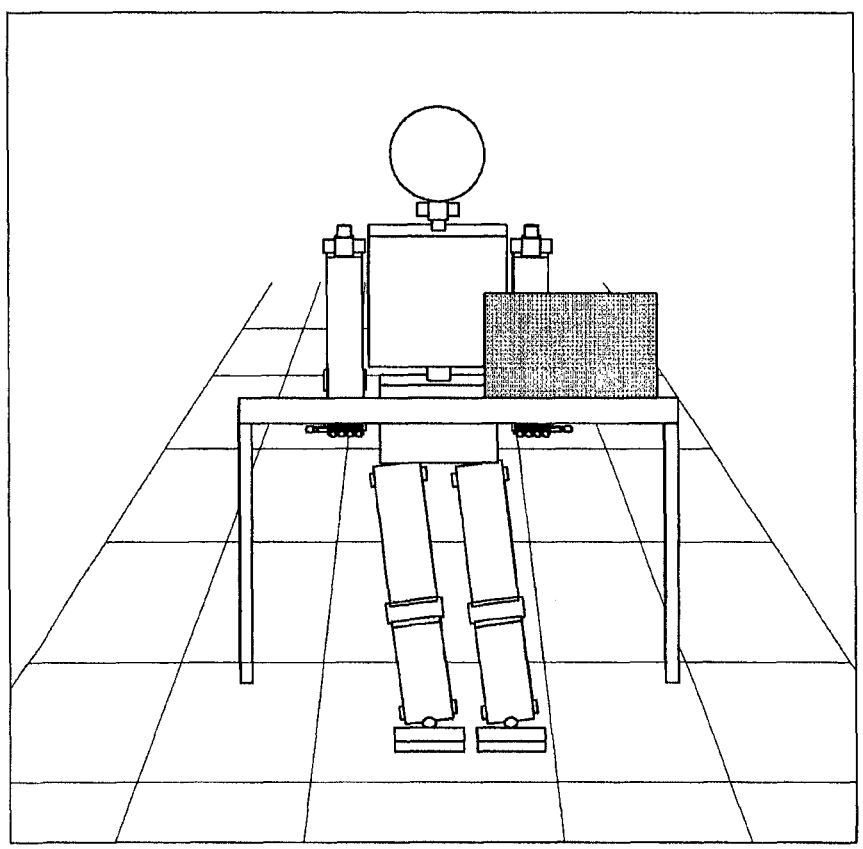
Figure 9:
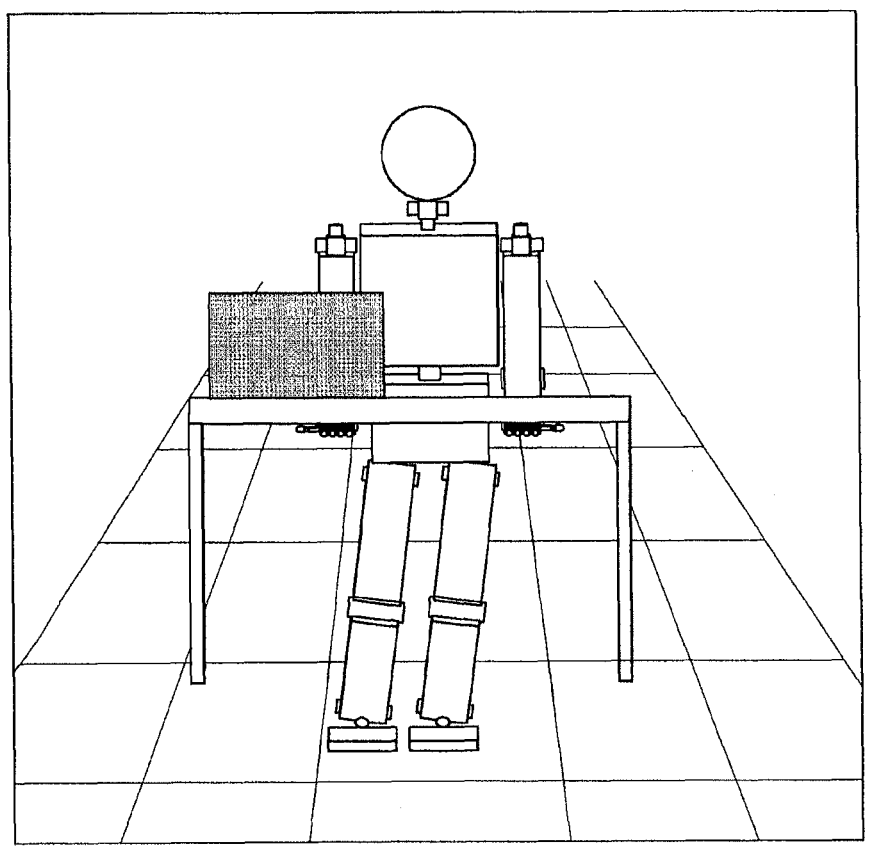

For example, even when a portion of an object on a table falls from the table such that the weight of the object is reduced, the position of the object is changed as shown in FIG. 7 or even when an object on a table is shifted to one side of the table and the balance of the robot is changed, the robot may maintain a stable posture and lift and hold up the object by changing the angles of the knees of the robot, pushing the hip of the robot backward or shifting the hip of the robot in the left and right directions.

Figure 10:
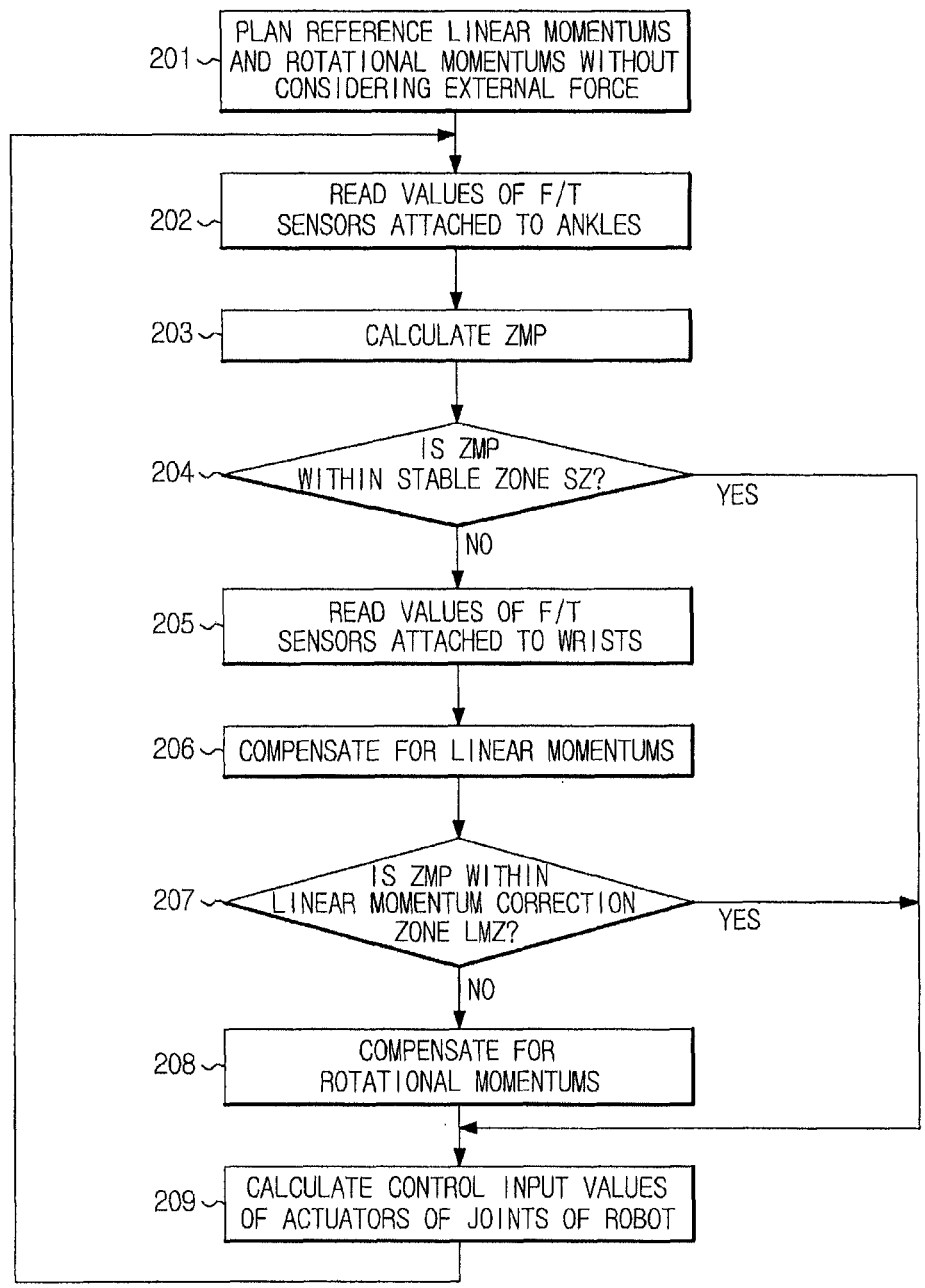
FIG. 10 is a flowchart illustrating a method of stabilizing a humanoid robot according to example embodiments.

FIG. 10 is a flowchart illustrating a method of stabilizing a humanoid robot according to example embodiments.

Before lifting and holding an object, the robot stabilization unit 34 plans or estimates reference linear momentums and reference rotational momentums to generate the whole-body motion of the robot, and the robot lifts and holds an object, according to Equation 1 without considering external force, that is, without using the values measured by the sensors attached to the wrists and ankles of the robot (201).

The robot stabilization unit 34 determines an initial posture in which the object begins to be lifted and held and a final posture in which the object reaches a target position, interpolates these postures, and generates the whole-body motion to lift and hold the object. Then, the object is lifted and held using the two arms. At this time, the forces and moments applied to the ankles are measured using the ankle F/T sensors 10 (202), and the ZMP is calculated by the ZMP calculation unit 31 using the measured forces and moments according to Equation 2 (203).

The robot stabilization unit 34 determines whether the calculated ZMP is within the stable zone SZ (204), and the holding of the object is continuously performed if it is determined that the calculated ZMP is present in the stable zone SZ (Yes in 204).

If the calculated ZMP is outside the stable zone SZ (No in 204), external force is measured by the F/T sensors 20 attached to the wrists (205), and the linear momentum compensation unit 32 compensates for the linear momentums which are initially planned at first or are set in the previous control period, using the measured sensor values (206).

Then, the robot stabilization unit 34 determines whether the calculated ZMP is within the linear momentum compensation zone LMZ (207). At this time, the determination is performed with the same ZMP in the same control period and the ZMP calculated in Operation 204 is used.

If it is determined that the calculated ZMP is within the linear momentum compensation zone LMZ (Yes in 207), it is determined that the robot may recover its balance by compensating for only the linear momentums and the object is continuously held. If it is determined that the calculated ZMP is not within the linear momentum compensation zone LMZ (No in 207), it is determined that the calculated ZMP is excessively outside of the stable zone SZ and is within the rotational momentum compensation zone AMZ. At this time, the rotational momentum compensation unit 33 compensates for the rotational momentums according to Equation 4 using the values measured by the ankle F/T sensors 10 (208).

Even when only the linear momentums are compensated for or even when the linear momentums and the rotational momentums are compensated for stepwise, the robot stabilization unit 34 generates the whole-body motion of the robot using the compensated momentums, calculates the control input values to control the angles of the joints of the robot according to the generated whole-body motion, and provides the control input values to the driving unit 40, so that the robot recovers its balance and continuously holds the object (209).

In the above-described example embodiments, a heavy object having a weight unknown to the robot may be stably lifted and held by compensating for linear momentums and rotational momentums according to the stability of a robot lifting and holding the object. In addition, the whole-body motion of the robot may be appropriately changed when the position and weight of the object are changed while holding the object.

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a embodiments have been shown and described, it should be appreciated by those skilled in the art that changes may be made in these embodiments without departing from the principles and spirit of the disclosure, the scope of which is defined in the claims and their equivalents.

What is claimed is:

1. An apparatus stabilizing a humanoid robot, the apparatus comprising:
a sensor to measure external force acting on the robot while the robot lifts and holds an object;
and a robot controller to compensate for linear momentum or for both the linear momentum and rotational momentum in a stepwise manner based on the measured external force, and to control an operation to lift and hold the object having a weight unknown to the robot by a whole-body motion of the robot generated using the compensated momentums,
wherein whether the robot controller compensates for the linear momentum or for both the linear momentum and the rotational momentum depends on a degree of stability of the robot;
wherein the robot controller further comprises a Zero Momentum Point (ZMP) calculation unit to calculate the ZMP, and
wherein the robot controller compensates for either the linear momentum or for both the linear momentum and the rotational momentum, based on whether the calculated ZMP is within one of a plurality of predefined zones.

2. The apparatus according to claim 1, wherein the sensor includes an ankle Force and Torque (F/T) sensor and a wrist F/T sensor.

3. The apparatus according to claim 2, wherein:
the robot controller includes a linear momentum compensation unit, a rotational momentum compensation unit, and a robot stabilization unit,
the linear momentum compensation unit compensates for the linear momentum using the measured value of the F/T sensor attached to wrists of the robot, and
the rotational momentum compensation unit compensates for the rotational momentum using the measured value of the F/T sensor attached to ankles of the robot.

4. The apparatus according to claim 3, wherein the robot stabilization unit estimates a reference linear momentum and a reference rotational momentum without considering the external force according to Equation 1:

$$P_{ref,x}=Mk_1(x_{ref}-x_{CoG})+Mx'_{ref}$$

$$P_{ref,y}=Mk_2(y_{ref}-y_{CoG})+My'_{ref}$$

$$P_{ref,z}=Mk_3(z_{ref}-z_{CoG})+Mz'_{ref}$$

$$L_{ref,x}=L_{ref,y}=L_{ref,z}=0 \quad \text{Equation 1}$$

where, M denotes the weight of the robot, $k_1$, $k_2$ and $k_3$ denote gains, $x_{ref}$, $y_{ref}$ and $z_{ref}$ respectively denote planned robot center-of-gravity position trajectories in axial directions (x-axis, y-axis and z-axis directions), $x'_{ref}$, $y'_{ref}$ and $z'_{ref}$ respectively denote planned robot center-of-gravity velocity trajectories in the axial directions (x-axis, y-axis and z-axis directions), and $x_{CoG}$, $y_{CoG}$ and $z_{CoG}$ respectively denote current robot center-of-gravity positions in the axial directions (x-axis, y-axis and z-axis directions).

5. The apparatus according to claim 3, wherein the ZMP calculation unit, only compensating for the linear momentum or compensating for both the linear momentum and the rotational momentum stepwise.

6. The apparatus according to claim 5, wherein, if the calculated ZMP is outside a stable zone and is within a linear momentum correction zone, the linear momentum compensation unit provides linear momentum $P'_{ref,x}$ and $P'_{ref,y}$ compensated for according to Equation 3 to the robot stabilization unit:

$$P'_{ref,x}=Mk_1(x_{ref}-x'_{CoG})+Mx'_{ref}$$

$$P'_{ref,y}=Mk_2(y_{ref}-y'_{CoG})+My'_{ref}$$

$$P'_{ref,z}=P_{ref,z}$$

$$x'_{CoG}=((-P_{x,RH}+ZMP_x)\times f_{z,RH}+(-P_{x,LH}+ZMP_x)\times f_{z,LH}))/Mg$$

$$y'_{CoG}=((-P_{y,RH}+ZMP_y)\times f_{z,RH}+(-P_{y,LH}+ZMP_y)\times f_{z,LH}))/Mg \quad \text{Equation 3}$$

where, RH denotes a right hand, LH denotes a left hand, $P_{x,RH}$ denotes a position of the right hand, $P_{y,LH}$ denotes a position of the left hand, $f_{z,RH}$ denotes a force acting on the right hand, $f_{z,LH}$ denotes a force acting on the left hand, g denotes an acceleration due to gravity, $ZMP_x$ denotes a ZMP in an x-axis direction, and $ZMP_y$ denotes a ZMP in a y-axis direction.

7. The apparatus according to claim 5, wherein, if the calculated ZMP is outside of a stable zone and is within a rotational momentum correction zone, the rotational momentum compensation unit provides rotational momentums $L'_{ref,x}$ and $L'_{ref,y}$ compensated for according to Equation 4 to the robot stabilization unit:

$$L'_{ref,x}=k_4 m_x$$

$$L'_{ref,y}=k_5 m_y \quad \text{Equation 4}$$

where, $k_4$ and $k_5$ denote gains, and $m_x$ and $m_y$ respectively denote the moments of the x-axis direction and the y-axis direction measured by the F/T sensor attached to an ankle.

8. The apparatus according to claim 1, wherein when the robot controller compensates for both the linear momentum and the rotational momentum, the robot controller first compensates for the linear momentum, and then compensates for the rotational momentum.

9. An apparatus stabilizing a humanoid robot, the apparatus comprising:
an ankle Force and Torque (F/T) sensor to measure an external force acting on ankles of the robot when lifting and holding an object;
a wrist F/T sensor to measure an external force acting on wrists of the robot when lifting and holding the object;
and a robot controller to compensate for linear momentum or for both the linear momentum and rotational momentum in a stepwise manner based on the measured external forces, change a whole-body motion which is initially generated before lifting and holding the object according to the measured external forces, and to control an operation to lift and hold the object by the changed whole-body motion,
wherein whether the robot controller compensates for the linear momentum or for both the linear momentum and the rotational momentum depends on a degree of stability of the robot; and
wherein the robot controller further comprises a Zero Momentum Point (ZMP) calculation unit to calculate the ZMP, and
wherein the robot controller compensates for either the linear momentum or for both the linear momentum and the rotational momentum, based on whether the calculated ZMP is within one of a plurality of predefined zones.

\* \* \* \* \*